(12) United States Patent
Soh

(10) Patent No.: US 9,178,451 B2
(45) Date of Patent: Nov. 3, 2015

(54) CONTROLLER FOR BRUSHLESS DC MOTOR WITH FLEXIBLE STARTUP AND METHOD THEREFOR

(71) Applicant: Silicon Laboratories Inc., Austin, TX (US)

(72) Inventor: Kok Hong Soh, Singapore (SG)

(73) Assignee: SILICON LABORATORIES INC., Austin, TX (US)

( * ) Notice: Subject to any disclaimer, the term of this patent is extended or adjusted under 35 U.S.C. 154(b) by 31 days.

(21) Appl. No.: 14/146,081

(22) Filed: Jan. 2, 2014

(65) Prior Publication Data

US 2015/0188462 A1 Jul. 2, 2015

(51) Int. Cl.
*H03K 5/00* (2006.01)
*H02P 6/08* (2006.01)
*H02P 6/20* (2006.01)

(52) U.S. Cl.
CPC ... *H02P 6/08* (2013.01); *H02P 6/20* (2013.01)

(58) Field of Classification Search
CPC .................................. H02P 6/14; H02P 6/142
USPC ................. 318/400.13, 400.01, 700
See application file for complete search history.

(56) References Cited

U.S. PATENT DOCUMENTS

| | | | |
|---|---|---|---|
| 5,289,097 A | 2/1994 | Erickson | |
| 5,552,685 A | 9/1996 | Young | |
| 5,764,024 A | 6/1998 | Wilson | |
| 5,986,426 A * | 11/1999 | Rowan | 318/599 |
| 6,693,407 B2 * | 2/2004 | Atmur | 318/811 |
| 7,514,894 B2 * | 4/2009 | Hoogzaad | 318/599 |
| 7,969,108 B2 | 6/2011 | Vermeir | |

OTHER PUBLICATIONS

Silicon Laboratories Inc., "Sensorless Brushless DC Motor Reference Design," Sep. 2006, 40 pages, AN208, Rev. 0.2 Sep. 2006, Silicon Laboratories Inc., 400 W. Cesar Chavez, Austin, Texas 78701.
Actions on the Merits for Copending U.S. Appl. No. 14/146,096, filed Jan. 2, 2014.

* cited by examiner

*Primary Examiner* — David S Luo

(74) *Attorney, Agent, or Firm* — Polansky & Associates, P.L.L.C.; Paul J. Polansky

(57) ABSTRACT

A controller for a brushless direct current (BLDC) motor includes a pulse width modulator and a control circuit. The pulse width modulator provides a plurality of phase control signals to control corresponding ones of a plurality of phases of the BLDC motor. The control circuit controls the pulse width modulator to provide pulses to the plurality of phases to control a speed of the BLDC motor by causing the pulse width modulator to adjust widths of the pulses when a measured current in an active one of a corresponding phase exceeds a threshold in a startup mode. In one form, the controller is part of a BLDC motor system which also includes a plurality of phase drivers each having inputs for receiving respective ones of said plurality of phase control signals, and outputs adapted to couple to corresponding phases of the BLDC motor.

18 Claims, 2 Drawing Sheets

CONTROLLER FOR BRUSHLESS DC MOTOR WITH FLEXIBLE STARTUP AND METHOD THEREFOR

CROSS REFERENCE TO RELATED APPLICATION

Related subject matter is contained in copending patent application Ser. No. 14/146,096, filed Jan. 2, 2014, entitled "Controller for Brushless DC Motor with Low Torque Ripple and Method Therefor," invented by the inventor hereof and assigned to the assignee hereof.

FIELD OF THE DISCLOSURE

The present disclosure relates generally to controllers for motors, and more particularly to controllers for brushless direct current motors and associated methods.

BACKGROUND

A brushless direct current (BLDC) motor typically includes a rotor containing one or more permanent magnets and a stator with electromagnets that are dynamically switched. A controller controls the motor speed and commutation by modulating the width of pulses applied to switches in each motor phase driver. In a typical BLDC motor startup sequence, the controller drives the motor like a stepper motor because there is no significant back EMF at zero or low speed to use in making zero-crossing commutation decisions. Thus the motor is initially commutated very slowly, and then its velocity is increased by reducing the commutation time while the PWM duty cycle is increased over time to boost the applied motor voltage and to keep the current constant. This startup sequence is typically implemented using a table of duty cycles and another table timing delays for each commutation for a typical configuration and load.

BRIEF DESCRIPTION OF THE DRAWINGS

The present disclosure may be better understood, and its numerous features and advantages made apparent to those skilled in the art by referencing the accompanying drawings, in which.

Figure 1:
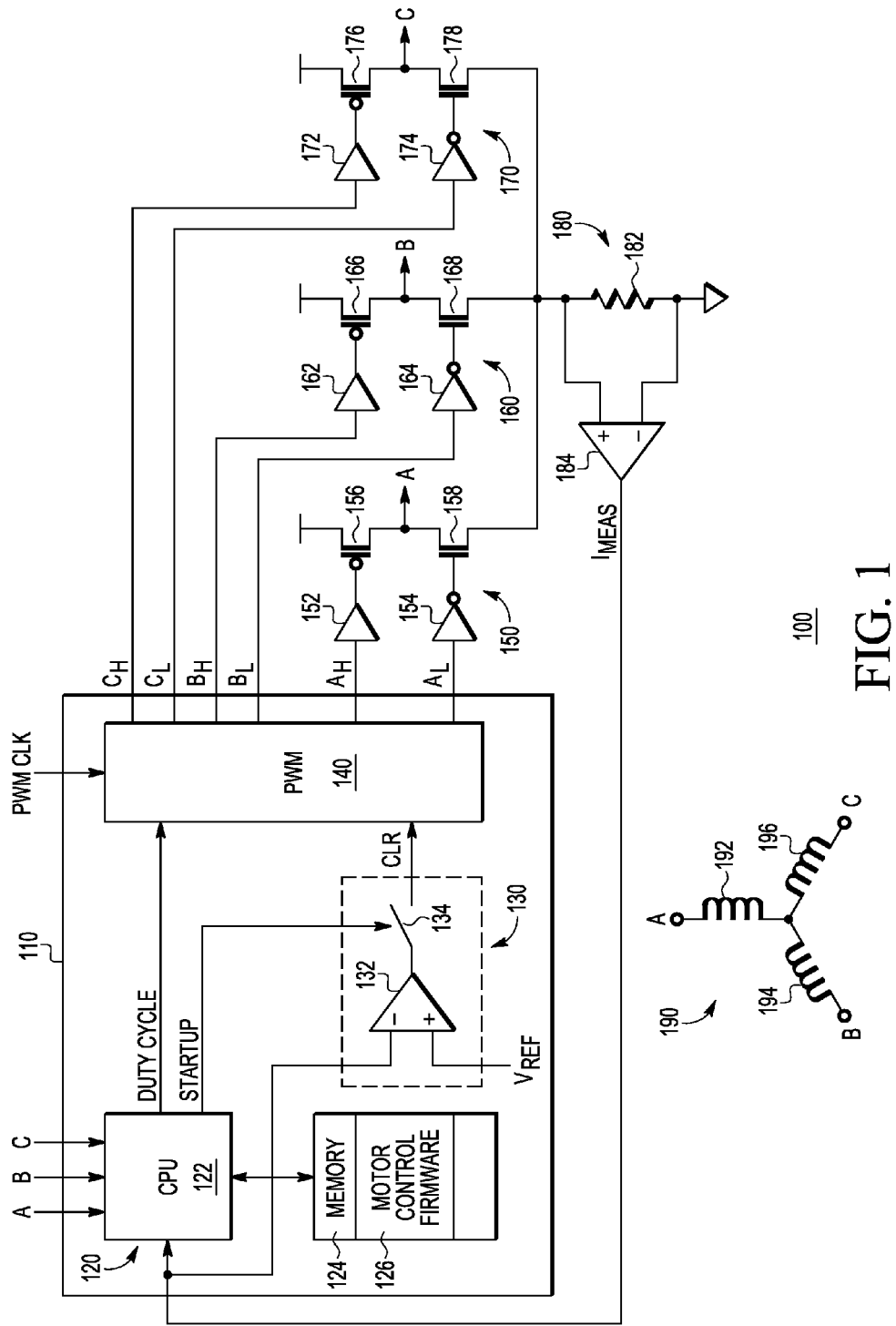
FIG. 1 illustrates in partial block diagram and partial schematic form a brushless direct current (BLDC) motor system according to one embodiment.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

A motor controller for a brushless direct current (BLDC) motor as disclosed herein includes a pulse width modulator and a control circuit. The pulse width modulator provides a plurality of phase control signals to control corresponding ones of a plurality of phases of the BLDC motor. The control circuit controls the pulse width modulator to provide pulses to the plurality of phases to control a speed of the BLDC motor by causing the pulse width modulator to adjust widths of the pulses when a measured current in an active one of a corresponding phase exceeds a threshold in a startup mode. By using a small amount of added hardware, the motor controller can eliminate the table of duty cycles, reducing the size of startup tables in memory by a few hundred bytes and allowing the use of a lower cost microcontroller unit (MCU). In one form, the control circuit can include a processor and a duty cycle adjustment circuit that responds to a measured current signal. The processor can include a central processing unit and a memory for storing motor control instructions that include the startup tables.

The duty cycle adjustment circuit can take the form of a comparator and a switch. In this case, the comparator has a first input for receiving the measured current signal, a second input for receiving the reference voltage, and an output, and the switch has a first input connected to the output of the comparator, a second input for receiving the startup signal, and an output connected to the second input of the pulse width modulator. Thus the duty cycle adjustment circuit adds a small amount of circuitry and the comparator is frequently available as a peripheral in the MCU.

The motor controller can be combined with phase drivers for each motor phase to form a BLDC motor system. Each phase driver can include drivers that receive respective phase control signals and that drive the gates of high- and low-drive transistors to drive the phases of the motor. The BLDC motor system can also include a current sense resistor between all of the phase drivers and ground and an amplifier connected across the electrodes of the current sense resistor to provide a voltage proportional to the current through the resistor.

In another form, a method for use with a BLDC motor includes, in a startup mode, generating a plurality of pulse width modulated control signals each having a duty cycle, for example a nominal duty cycle of about a 50%, for corresponding phases of the BLDC motor and reducing the duty cycle of the pulse width modulated control signals in response to a measured current in a corresponding phase exceeding a threshold, wherein said reducing occurs by modifying the generating. The method can include operating in the startup mode until a rotor speed of the BLDC motor reaches a fraction of its maximum speed, for example about 5% of its maximum speed. The method also includes, in a normal operation mode, generating the plurality of pulse width modulated control signals with a duty cycle corresponding to a desired speed, and commutating the BLDC motor based on the measured current and a plurality of phase voltages.

FIG. 1 illustrates in partial block diagram and partial schematic form a brushless direct current (BLDC) motor system 100 according to one embodiment. BLDC motor system 100 generally includes a controller 110, a set of phase drivers 150, 160, and 170, a feedback circuit 180, and a three-phase BLDC motor 190.

Controller 110 generally includes a processor 120, a duty cycle adjustment circuit 130, and a pulse width modulator (PWM) 140. Processor 120 in turn includes a central processing unit (CPU) 122 and a memory 124. CPU 122 has an input for receiving a signal labeled "$I_{MEAS}$", inputs for receiving phase signals labeled "A", "B", and "C", a bidirectional memory interface, and outputs for providing signals labeled "DUTY CYCLE" and "STARTUP". Controller 110 is implemented as a single-chip MCU that uses analog and digital interfaces such as general purpose input/output (GPIO) ports and analog-to-digital converters that are conventional and are not shown for simplicity. Memory 124 has an access port connected to the bidirectional memory interface of CPU 122, and includes a portion for storing motor control firmware 126, which includes instructions for controlling BLDC motor 190. Duty cycle adjustment circuit 130 includes a comparator 132 and a switch 134. Comparator 132 has a negative input for receiving the $I_{MEAS}$ signal, a positive input for receiving a reference voltage labeled "$V_{REF}$", and an output. Switch 134 includes a first pole connected to the output of comparator 132, a second pole for providing a signal labeled "$\overline{CLR}$", and a control input for receiving the STARTUP signal. PWM 140 has a first input for receiving the DUTY CYCLE signal, a second input for receiving the $\overline{CLR}$ signal, a third input for receiving a clock signal labeled "PWM CLK", and outputs for providing phase control signals. For use with a three-phase BLDC motor, PWM 140 has a first set of outputs for providing phase control signals labeled "$A_H$" and "$A_L$", a second set of outputs for providing phase control signals labeled "$B_H$" and "$B_L$", and a third set of outputs for providing phase control signals labeled "$C_H$" and "$C_L$".

Phase driver 150 includes drivers 152 and 154, a P-channel metal-oxide-semiconductor (MOS) transistor 156, and an N-channel MOS transistor 158. Driver 152 has an input for receiving the $A_H$ phase control signal, and an inverting output. Driver 154 has an input for receiving the $A_L$ phase control signal, and a non-inverting output. Transistor 156 has a source connected to a power supply voltage conductor, a gate connected to the output of driver 152, and a drain for providing phase signal A. The power supply voltage conductor receives a voltage suitable for the application, such as 12.0 volts. Transistor 158 has a drain connected to the drain of transistor 156, a gate connected to the inverting output of driver 154, and a source.

Phase driver 160 includes drivers 162 and 164, a P-channel MOS transistor 166, and an N-channel MOS transistor 168. Driver 162 has an input for receiving the $B_H$ phase control signal, and an inverting output. Driver 164 has an input for receiving the $B_L$ phase control signal, and a non-inverting output. Transistor 166 has a source connected to the power supply voltage conductor, a gate connected to the output of driver 162, and a drain for providing phase signal B. Transistor 168 has a drain connected to the drain of transistor 166, a gate connected to the inverting output of driver 164, and a source connected to the source of transistor 158.

Phase driver 170 includes drivers 172 and 174, a P-channel MOS transistor 176, and an N-channel MOS transistor 178. Driver 172 has an input for receiving the $C_H$ phase control signal, and an inverting output. Driver 174 has an input for receiving the $C_L$ phase control signal, and a non-inverting output. Transistor 176 has a source connected to the power supply voltage conductor, a gate connected to the output of driver 172, and a drain for providing phase signal C. Transistor 178 has a drain connected to the drain of transistor 176, a gate connected to the inverting output of driver 174, and a source connected to the sources of transistors 158 and 168.

Feedback circuit 180 includes a sense resistor 182 and an amplifier 184. Sense resistor 182 has a first electrode connected to the sources of transistors 158, 168, and 178, and a second electrode connected to ground. Amplifier 184 has a positive input connected to the first electrode of sense resistor 182, a negative input connected to the second electrode of sense resistor 182, and an output for providing signal $I_{MEAS}$.

BLDC motor 190 includes stator windings 192, 194, and 196 modeled electrically as inductors. Stator winding 192 includes a first end for receiving signal A, and a second end connected to a common node. Stator winding 194 includes a first end for receiving signal B, and a second end connected to the common node. Stator winding 196 includes a first end for receiving signal C, and a second end connected to the common node. As should be apparent, FIG. 1 shows the pertinent electrical portion of the DC motor and additional details of the electrical and mechanical properties of the DC motor are not shown in FIG. 1.

In operation, BLDC motor system 100 includes controller 110 for starting up and operating BLDC motor 190 at a desired speed by changing the duty cycle of one PWM phase control signal for each of three phases using well-known pulse width modulation techniques. Controller 110 is flexible because it can be used under a variety of operating conditions and with varying loads by adjusting the startup sequence dynamically.

In the startup mode, CPU 122 provides the DUTY CYCLE signal to PWM 140 at a value to indicate a nominal 50% duty cycle. PWM 140 provides the phase control signals to control the phase of BLDC motor 190 according to TABLE I, TABLE II, or TABLE III below depending on the type of drive used:

TABLE I (Low-side PWM drive)

| COMM. PHASE | ANGLE (DEG.) | HIGH-SIDE $A_H$ | $B_H$ | $C_H$ | LOW-SIDE $A_L$ | $B_L$ | $C_L$ | OPEN PHASE |
|---|---|---|---|---|---|---|---|---|
| 0 | 0-60 | OFF | OFF | ON | OFF | PWM | OFF | A |
| 1 | 60-120 | ON | OFF | OFF | OFF | PWM | OFF | C |
| 2 | 120-180 | ON | OFF | OFF | OFF | OFF | PWM | B |
| 3 | 180-240 | OFF | ON | OFF | OFF | OFF | PWM | A |
| 4 | 240-300 | OFF | ON | OFF | PWM | OFF | OFF | C |
| 5 | 200-360 | OFF | OFF | ON | PWM | OFF | OFF | B |

TABLE II (High-side PWM drive)

| COMM. PHASE | ANGLE (DEG.) | HIGH-SIDE $A_H$ | $B_H$ | $C_H$ | LOW-SIDE $A_L$ | $B_L$ | $C_L$ | OPEN PHASE |
|---|---|---|---|---|---|---|---|---|
| 0 | 0-60 | OFF | OFF | PWM | OFF | ON | OFF | A |
| 1 | 60-120 | PWM | OFF | OFF | OFF | ON | OFF | C |
| 2 | 120-180 | PWM | OFF | OFF | OFF | OFF | ON | B |
| 3 | 180-240 | OFF | PWM | OFF | OFF | OFF | ON | A |
| 4 | 240-300 | OFF | PWM | OFF | ON | OFF | OFF | C |
| 5 | 200-360 | OFF | OFF | PWM | ON | OFF | OFF | B |

TABLE III (Mixed-mode PWM drive)

| COMM. PHASE | ANGLE (DEG.) | HIGH-SIDE $A_H$ | $B_H$ | $C_H$ | LOW-SIDE $A_L$ | $B_L$ | $C_L$ | OPEN PHASE |
|---|---|---|---|---|---|---|---|---|
| 0 | 0-60 | OFF | OFF | ON | OFF | PWM | OFF | A |
| 1 | 60-120 | PWM | OFF | OFF | OFF | ON | OFF | C |
| 2 | 120-180 | ON | OFF | OFF | OFF | OFF | PWM | B |
| 3 | 180-240 | OFF | PWM | OFF | OFF | OFF | ON | A |
| 4 | 240-300 | OFF | ON | OFF | PWM | OFF | OFF | C |
| 5 | 200-360 | OFF | OFF | PWM | ON | OFF | OFF | B |

Thus for example during commutation phase 0 using mixed-mode PWM drive, PWM 140 activates signals $C_H$ and $B_L$, causing current to flow from the power supply voltage conductor through transistor 176 to phase signal C and through stator windings 196 and 194 to phase signal B and through transistor 168 and sense resistor 182 to ground. Signals $A_H$, $B_H$, $A_L$, and $C_L$ are inactive at this time. CPU 122 measures the back EMF using the inactive phase signal A, and signal $I_{MEAS}$ to vary the DUTY CYCLE signal to achieve the desired speed. This operation proceeds through commutation phases 1-5 according to the sequence in TABLE I, in which each commutation phase corresponds to another 60° in electrical angle. The sequence repeats after the end of commutation phase 5.

CPU 122 also activates the STARTUP signal to indicate the startup mode. Feedback circuit 180 measures the current of an active phase across sense resistor 182. Sense resistor 182 is a low-valued, precision resistor that keeps power loss low while providing an accurate current measurement. Amplifier 184 provides signal $I_{MEAS}$ as a voltage proportional to the current in the active phase. Note that since just one high side and one low side transistor will be active at a time, the sources of transistors 158, 168, and 178 can conveniently be connected together and through a common sense resistor to ground to avoid the need for extra sense resistors and amplifiers.

The activation of the STARTUP signal closes switch 134. Thus duty cycle adjustment circuit 130 keeps signal $\overline{CLR}$ inactive while signal $I_{MEAS}$ is below $V_{REF}$, and activates signal $\overline{CLR}$ when signal $I_{MEAS}$ rises above $V_{REF}$. $V_{REF}$ is a voltage having a nominal value of, for example, 1.8 volts. Thus sense resistor 182 and amplifier 184 are sized to provide signal $I_{MEAS}$ at about 1.8 volts when the maximum desired amount of startup current is flowing.

In response to the activation of signal $\overline{CLR}$, PWM 140 returns the phase control signals in the current phase to their inactive states. When the phase control signals are inactive, the corresponding drive transistors stop conducting current, and $I_{MEAS}$ quickly falls back to zero. Thus controller 110 provides cycle-by-cycle control in the startup mode. Controller 110 continues to increase the speed of BLDC motor 190 until it reaches about 5% of its nominal operating speed. At this point, controller 110 deactivates the STARTUP signal and enters normal operation mode.

In the normal operation mode, controller 110 uses phase signals A, B, and C and various real time clocks to determine when to commutate BLDC motor 190 according to its desired speed in the sequence shown in TABLE I, TABLE II, or TABLE III above. Controller 110 senses the back electromotive force (EMF) and uses zero-crossing detection techniques to determine the duty cycle and commutation time. These techniques are well-known in the art and will not be discussed in detail.

Figure 2:
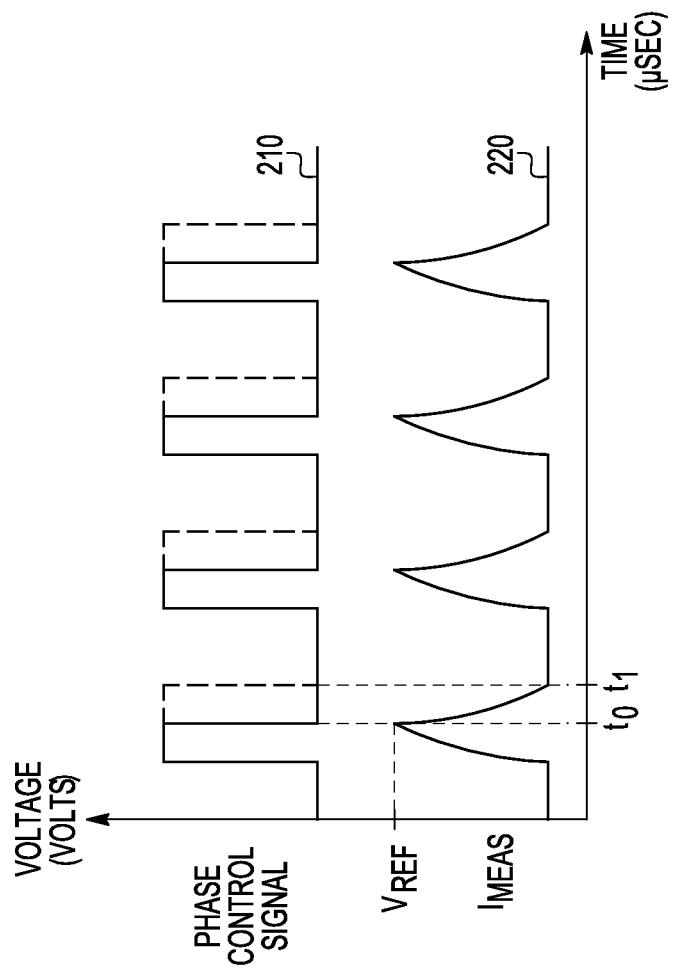
FIG. 2 illustrates a timing diagram useful in understanding the operation of the BLDC motor system of FIG. 1.

FIG. 2 illustrates a timing diagram 200 useful in understanding the operation of the motor system of FIG. 1. In timing diagram 200, the horizontal axis represents time in microseconds (μsec), and the vertical axis represent voltage in volts. Timing diagram 200 shows two waveforms of interest including a waveform 210 labeled "PHASE CONTROL SIGNAL", and a waveform 220 for the $I_{MEAS}$ signal. The PHASE CONTROL SIGNAL is any one of phase control signals $A_H$, $A_L$, $B_H$, $B_L$, $C_H$, or $C_L$, where PWM is applied as indicated in TABLE I, TABLE II, or TABLE III. During the startup mode, the PHASE CONTROL SIGNAL has a nominal duty cycle of about 50% (which is shown by the solid line extended by the dashed line). However, the $I_{MEAS}$ voltage operates to reduce the duty cycle on a cycle-by-cycle basis when it reaches $V_{REF}$. So for example when the PHASE CONTROL SIGNAL switches to a high voltage to make its corresponding transistor conductive, $I_{MEAS}$ starts to rise until it reaches $V_{REF}$ at a first time labeled "t0". At t0, the output of comparator 132 switches to a logic low to activate the $\overline{CLR}$ signal. When $\overline{CLR}$ goes low, PWM 140 deactivates the corresponding PHASE CONTROL SIGNAL.

In this way, motor controller 110 limits the effective duty cycle of each phase control signal in startup mode. Since it uses a hardware comparator, controller 110 avoids the need for complex startup tables. In an exemplary embodiment, motor control firmware 126 eliminates the table of duty cycles and saves a few hundred bytes of memory when using an Intel 8051 microcontroller core to control the startup sequence. Thus the addition of a small amount of circuitry, which is commonly present in MCUs, allows a significant reduction in the size of motor control firmware 126.

The above-disclosed subject matter is to be considered illustrative, and not restrictive, and the appended claims are intended to cover all such modifications, enhancements, and other embodiments that fall within the true scope of the claims. For example, the technique described above is also applicable to two-phase BLDC motors and to BLDC motors having more than three phases. In some embodiments, all the elements of motor controller 110 can be combined in a low-cost CMOS integrated circuit. In some embodiments which use manufacturing technologies in which high-power transistors can be integrated with low-voltage CMOS on the same chip, motor controller 110 and phase drivers 150, 160, and 170 can be combined on the same integrated circuit chip.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A controller for a brushless direct current (BLDC) motor, comprising:
    a pulse width modulator for providing a plurality of phase control signals to control corresponding ones of a plurality of phases of the BLDC motor; and
    a control circuit for controlling said pulse width modulator to provide pulses to said plurality of phases to control a speed of the BLDC motor by causing said pulse width modulator to adjust widths of said pulses when a measured current in an active one of a corresponding phase exceeds a threshold in a startup mode, wherein in said startup mode said control circuit controls said pulse width modulator to provide said pulses at a duty cycle to said plurality of phases, and reduces said duty cycle of said pulses based on a time when said measured current in said active one of said plurality of phases exceeds said threshold.

2. The controller of claim 1, wherein said control circuit adjusts said widths of said pulses in a normal operation mode according to a desired speed, and determines a commutation time based on a measured current signal and a plurality of phase signals corresponding to said plurality of phases.

3. The controller of claim 1, wherein said control circuit comprises:
    a processor having a first input for receiving a measured current signal, a second input for receiving sensed voltage signals, a first output for providing a duty cycle signal, and a second output for providing a startup signal; and
    a duty cycle adjustment circuit having a first input for receiving said measured current signal, a second input for receiving a reference voltage, a third input for receiving said startup signal, and an output for providing a clear signal when said measured current signal exceeds said reference voltage when said startup signal is active.

4. The controller of claim 3, wherein said processor comprises:
    a central processing unit; and
    a memory coupled to said central processing unit storing instructions for controlling operation of said pulse width modulator, wherein said instructions cause said central processing unit to activate said startup signal during a startup period of the BLDC motor.

5. The controller of claim 4, wherein said central processing unit operates under control of said instructions to start the BLDC motor during said startup period without using a table of duty cycles.

6. The controller of claim 3, wherein said duty cycle adjustment circuit comprises:
a comparator having a first input for receiving said measured current signal, a second input for receiving said reference voltage, and an output; and
a switch having a first input coupled to said output of said comparator, a second input for receiving said startup signal, and an output coupled to said second input of said pulse width modulator.

7. A brushless direct current (BLDC) motor system, comprising:
a processor having a first input for receiving a measured current signal, a second input for receiving sensed voltage signals, a first output for providing a duty cycle signal, and a second output for providing a startup signal;
a duty cycle adjustment circuit having a first input for receiving said measured current signal, a second input for receiving a reference voltage, a third input for receiving said startup signal, and an output for providing a clear signal when said measured current signal exceeds said reference voltage when said startup signal is active; and
a pulse width modulator having a first input for receiving said duty cycle signal, a second input for receiving said clear signal, and an output for providing a plurality of phase control signals to control corresponding phases of the BLDC motor each active for a time corresponding to said duty cycle signal when said clear signal is inactive, and inactive when said clear signal is active.

8. The BLDC motor system of claim 7, further comprising:
a plurality of phase drivers each having inputs for receiving respective ones of said plurality of phase control signals, and outputs adapted to couple to corresponding phases of a BLDC motor.

9. The BLDC motor system of claim 8, wherein each of said plurality of phase drivers comprises:
a first driver having an input for receiving a first phase control signal of a first phase, and an output;
a second driver having an input for receiving a second phase control signal of said first phase, and an output;
a first transistor having a first current electrode coupled to a first power supply voltage conductor, a control electrode coupled to said output of said first driver, and a second current electrode adapted to couple to a corresponding phase of the BLDC motor; and
a second transistor having a first current electrode coupled to said second current electrode of said first transistor, a control electrode coupled to said output of said second driver, and a second current electrode coupled to a second power supply voltage conductor.

10. The BLDC motor system of claim 9, wherein said second transistor of all of said phase drivers are coupled together and to said second power supply voltage conductor through a sense resistor.

11. The BLDC motor system of claim 10, further comprising:
an amplifier having a first input coupled to a first electrode of said sense resistor, a second input coupled to a second electrode of said sense resistor, and an output for providing said measured current signal.

12. The BLDC motor system of claim 7, wherein said processor comprises:
a central processing unit; and
a memory coupled to said central processing unit storing instructions for controlling operation of said pulse width modulator, wherein said instructions cause said central processing unit to activate said startup signal during a startup period of the BLDC motor.

13. The BLDC motor system of claim 7, wherein said duty cycle adjustment circuit comprises:
a comparator having a first input for receiving said measured current signal, a second input for receiving said reference voltage, and an output; and
a switch having a first input coupled to said output of said comparator, a second input for receiving said startup signal, and an output coupled to said second input of said pulse width modulator.

14. The BLDC motor system of claim 7, wherein said processor adjusts said duty cycle signal in response to said sensed voltage signals.

15. The BLDC motor system of claim 7, wherein in response to said startup signal said processor provides said duty cycle signal to said pulse width modulator to indicate a duty cycle, and said duty cycle adjustment circuit reduces said duty cycle of said pulses based on a time when said measured current in said active one of said plurality of phases exceeds said voltage reference.

16. A method for use with a brushless direct current (BLDC) motor comprising:
in a startup mode:
generating a plurality of pulse width modulated control signals each having a duty cycle for corresponding phases of the BLDC motor responsive to a duty cycle signal indicating a nominal duty cycle during said startup mode; and
reducing said duty cycle of said pulse width modulated control signals in response to a measured current in a corresponding phase exceeding a threshold, wherein said reducing comprises clearing said pulse width modulated control signals when said measured current exceeds said threshold in said startup mode.

17. The method of claim 16, further comprising operating in said startup mode until a rotor speed of the BLDC motor reaches a fraction of its maximum speed.

18. The method of claim 16, wherein:
in a normal operation mode:
generating said plurality of pulse width modulated control signals with a duty cycle corresponding to a desired speed; and
commutating the BLDC motor based on said measured current and a plurality of phase voltages.

* * * * *